(12) United States Patent
Yang et al.

(10) Patent No.: US 8,988,643 B2
(45) Date of Patent: Mar. 24, 2015

(54) PEEP-PROOF DISPLAY APPARATUS AND DRIVING METHOD THEREOF

(71) Applicant: AU Optronics Corp., Hsin-Chu (TW)

(72) Inventors: Chih-Hsiang Yang, Hsin-Chu (TW); Chao-Wei Yeh, Hsin-Chu (TW); Chen-Feng Fan, Hsin-Chu (TW); Chien-Huang Liao, Hsin-Chu (TW); Wen-Hao Hsu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 163 days.

(21) Appl. No.: 13/862,548

(22) Filed: Apr. 15, 2013

(65) Prior Publication Data

US 2014/0063386 A1 Mar. 6, 2014

(30) Foreign Application Priority Data

Sep. 4, 2012 (TW) .............................. 101132216 A

(51) Int. Cl.
   *G02F 1/133* (2006.01)
   *G02F 1/13* (2006.01)
   *G02F 1/1343* (2006.01)
   *G09G 3/36* (2006.01)

(52) U.S. Cl.
   CPC .......... *G02F 1/13306* (2013.01); *G02F 1/1323* (2013.01); *G02F 1/134309* (2013.01); *G09G 3/36* (2013.01); *G02F 2001/134381* (2013.01); *G09G 2300/023* (2013.01); *G09G 2300/0447* (2013.01)
   USPC ........................................................ 349/141

(58) Field of Classification Search
   CPC .......... G02F 1/134309; G02F 1/13306; G02F 1/1323; G09G 3/36
   USPC ..................................................... 349/33, 141
   See application file for complete search history.

(56) References Cited

U.S. PATENT DOCUMENTS

| 8,736,781 B2 | 5/2014 | Lee |
| 2010/0007826 A1 | 1/2010 | Lu et al. |
| 2010/0128189 A1* | 5/2010 | Teranishi et al. ............... 349/33 |

(Continued)

FOREIGN PATENT DOCUMENTS

| CN | 1991466 A | 7/2007 |
| CN | 101995721 A | 3/2011 |

(Continued)

OTHER PUBLICATIONS

China Patent Office, "Office Action", Nov. 24, 2014.

*Primary Examiner* — Michael Caley
(74) *Attorney, Agent, or Firm* — WPAT, PC; Justin King

(57) ABSTRACT

A peep-proof display apparatus includes a plurality of sub-pixels disposed between a first substrate and a second substrate. Each sub-pixel includes a first conductive layer, a color filter layer, an isolation film, a light modulator layer, a second conductive layer, an insulation film and a third conductive layer. The color filter layer is disposed between the first conductive layer and the isolation film. The light modulator layer is disposed between the isolation film and the second conductive layer. The insulation film is disposed between the second and third conductive layers. In a first display mode, the light modulator layer is applied with an electric field parallel thereto. In a second display mode, the light modulator layer is applied with an electric field parallel thereto and an electric field perpendicular thereto.

8 Claims, 8 Drawing Sheets

(56) References Cited

U.S. PATENT DOCUMENTS

2011/0050552 A1* 3/2011 Miyazaki et al. ............... 345/92
2013/0300989 A1* 11/2013 Hibayashi et al. ............ 349/108

FOREIGN PATENT DOCUMENTS

TW        I346227          8/2011
WO    WO 2012105067 A1 *  8/2012

* cited by examiner

PEEP-PROOF DISPLAY APPARATUS AND DRIVING METHOD THEREOF

TECHNICAL FIELD

The present disclosure relates to a display apparatus and a driving method thereof, and more particularly to a peep-proof display apparatus and a driving method thereof.

BACKGROUND

In recent years, the multi-angle display technology is widely used in some specific applications of display apparatus. In the conventional multi-angle display structure such as the fringe field switching (FFS) and the in-plane switching (IPS), even a proper viewing angle effect can be obtained by controlling the rotation of liquid crystal via switching the electric field between two electrodes; however, these conventional multi-angle display structures cannot effectively provide privacy protection. In general, the user prefers to receive information from a display apparatus within a limited viewing angle; in other words, the non-related people cannot read or receive the information from the display apparatus if they are located out of the viewing angle of the display apparatus. Thus, content shown on the display is prevented from being glimpsed.

Today, some of the peep-proof designs are realized by employing specific pixel structures. Specifically, through employing additional sub-pixels with side-light leakage characteristics in the pixel structures, the peep-proof function is realized. However, because these additional sub-pixels do not contribution a front brightness, the associated display apparatus accordingly has a lower transmittance and contrast performance.

SUMMARY

An embodiment of the disclosure is to provide a peep-proof display apparatus. The peep-proof display apparatus includes a plurality of sub-pixels. Each one of the sub-pixels includes a first conductive layer, an isolation film, a light modulator layer, a second conductive layer, an insulation film and a third conductive layer. The first conductive layer includes two surfaces and on one of which a first substrate is disposed. The isolation film is disposed on another surface of the first conductive layer. The light modulator layer includes a plurality of liquid crystal. The light modulator layer is disposed between the isolation film and the second conductive layer. The insulation film is disposed between the second and third conductive layers. A second substrate is disposed on another surface of the third conductive layer. In a first display mode, the light modulator layer is applied with an electric field parallel thereto. In a second display mode, the light modulator layer is applied with an electric field parallel thereto and an electric field perpendicular thereto.

Another embodiment of the disclosure is to provide a driving method of the aforementioned display apparatus with privacy protection. The driving method includes applying a first voltage to both of the first and third conductive layers and a second voltage to the second conductive layer in a first display mode; and applying an electric field, parallel to the light modulator layer, and an electric field, perpendicular to the light modulator layer, to the light modulator layer in a second display mode.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
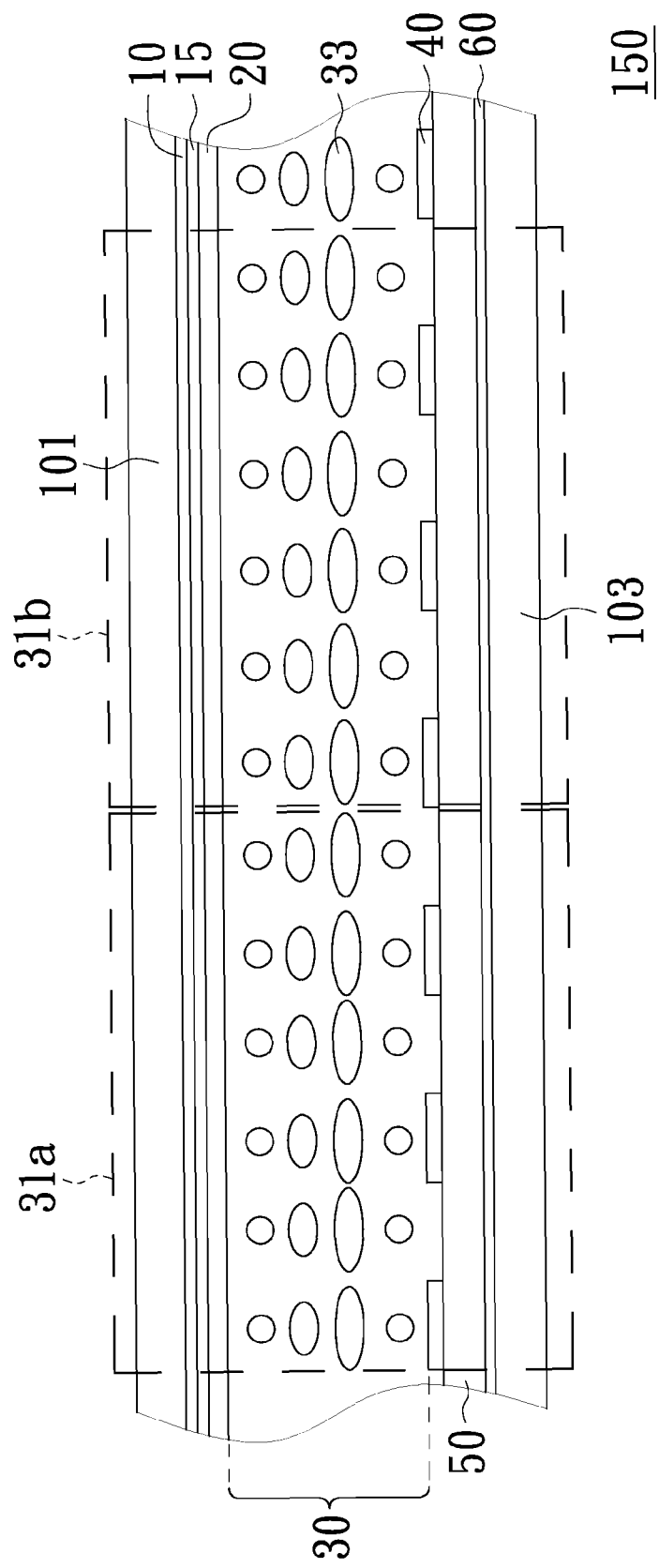
FIG. 1A is a schematic cross-sectional view of an peep-proof display apparatus in accordance with an embodiment of the present disclosure.
Figure 1B:
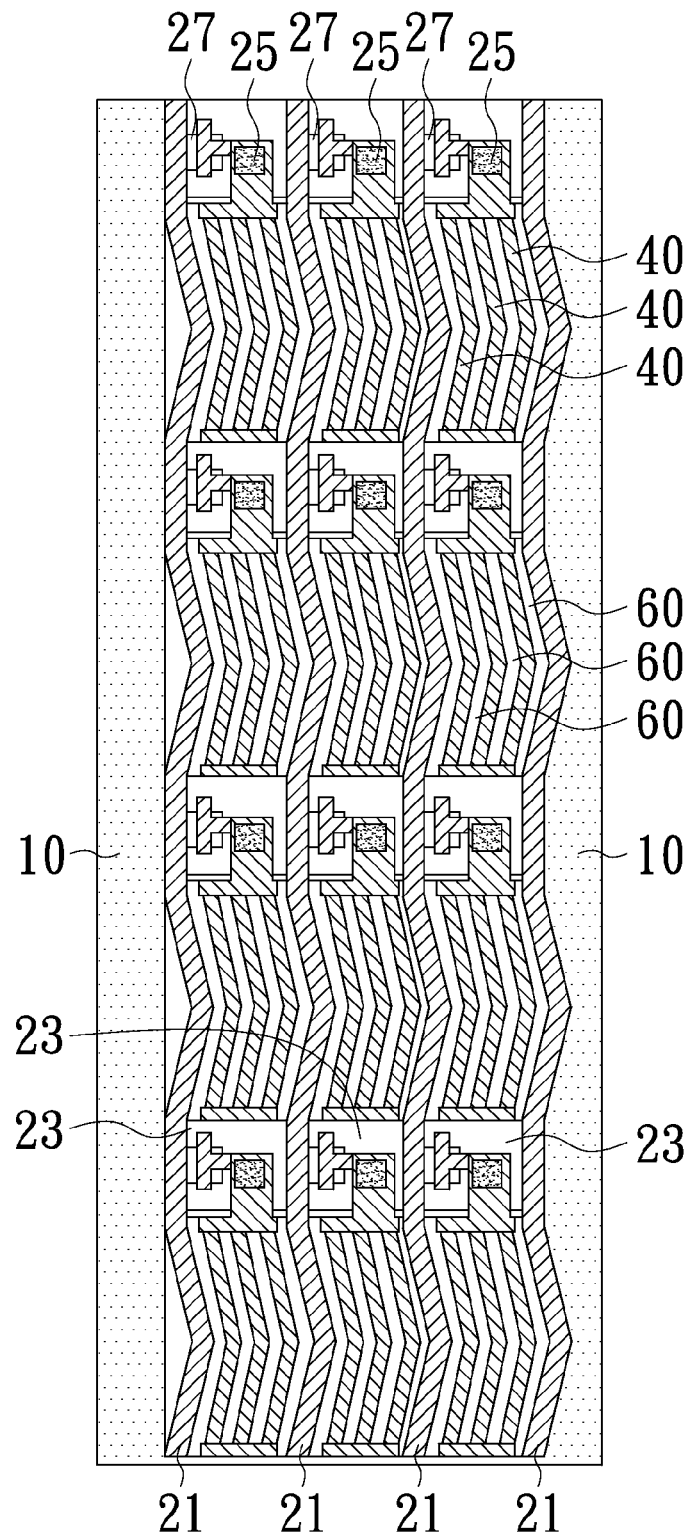
FIG. 1B is an internal layout view of the peep-proof display apparatus of the present disclosure.

FIG. 1A is a schematic cross-sectional view of a peep-proof display apparatus in accordance with an embodiment of the present disclosure; and FIG. 1B is a layout view of the peep-proof display apparatus shown in FIG. 1A. As shown in FIG. 1A, the peep-proof display apparatus 150 in this embodiment includes a plurality of sub-pixels 31a, 31b. The sub-pixels 31a, 31b both include a first substrate 101, a first conductive layer 10, a color filter layer 15, an isolation film 20, a light modulator layer 30, a second conductive layer 40, an insulation film 50, a third conductive layer 60 and a second substrate 103. As shown in FIG. 1B, the peep-proof display apparatus 150 is further associated with a plurality of data lines 21, a plurality of gate lines 23, a plurality of contact holes 25 and a plurality of semiconductor layers 27 (e.g., amorphous silicon semi-conductor); wherein the contact holes 25 are configured to establish a conduction between the second conductive layer 40 and the data lines 21.

The first substrate 101 has an upper surface (not labeled) and a lower surface (not labeled). Specifically, the first substrate 101 is a transparent substrate, such as a glass substrate, a flexible substrate or a substrate made of materials with a light transmittance greater than or equal to 80%. Preferably, the first substrate 101 in this embodiment has a light transmittance greater than or equal to 90%.

The first conductive layer 10 is disposed on the lower surface of the first substrate 101. Preferably, the first conductive layer 10 is made of transparent conducting oxides (TCO) or thin metals. The transparent conductive oxides may include indium tin oxide (ITO), indium zinc oxide (IZO), aluminum zinc oxide (AZO), gallium zinc oxide (GZO), or indium molybdenum oxide (IMO), and the thin metals may include silver (Ag), aluminum (Al) or an alloy thereof; and the present disclosure is not limited thereto.

The color filter layer 15 is disposed on the bottom of the first conductive layer 10, and the isolation film 20 is disposed on the bottom of the color filter layer 15; but the present disclosure is not limited thereto. In other words, the color filter layer 15 may be disposed between the first substrate 101 and the first conductive layer 10 in another embodiment. The isolation film 20 is configured to have an area approximately equal to that of the first conductive layer 10. As shown in FIG. 1A, in a first display mode the isolation film 20 is configured to reduce or even eliminate the effect of force, resulted from the electric field generated by the first conductive layer 10, on the liquid crystal 33; wherein the first display mode herein is referred to as a wide viewing (WV) angle display mode. The isolation film 20 is not limited to be made of insulating materials; in other words, any materials able to reduce the electric field force on the liquid crystal 33 can be used therein in this embodiment.

As shown in FIG. 1A, the third conductive layer 60 is disposed on the second substrate 103. Specifically, the second substrate 103 is a transparent substrate, such as a glass substrate, a flexible substrate or a substrate made of materials with high transmittance. The third conductive layer 60 may be made of materials similar to or same as that of the first conductive layer 10; and likewise, the third conductive layer 60 preferably is made of transparent conducting oxides (TCO) or thin metals.

The insulating film 50 is disposed on the top of the third conductive layer 60; and the second conductive layer 40 is disposed on the top of the insulating film 50. The insulating film 50 is configured to electrically insulate the second conductive layer 40 and the third conductive layer 60 to each other. The second conductive layer 40 may be made of the materials similar to or same as that of the third conductive layer 60 or the first conductive layer 10; and likewise, the second conductive layer 40 preferably is made of transparent conducting oxides (TCO) or thin metals.

As shown in FIG. 1A, the second conductive layer 40 has a plurality of grooves located under the sub-pixels 31 and the optical modulator layer 30. The second conductive layer 40 is configured to, for example, serve as the pixel electrode of the sub-pixels 31. The optical modulation element layer 30, disposed between the second conductive layer 40 and the insulating film 20, includes a plurality of liquid crystal 33.

In some other embodiments, the bottom of the isolation film 20 and the top of the second conductive layer 40 (that is, the two sides of the optical modulator layer 30) each may be further disposed with an alignment layer (not shown), by which the major axes of the liquid crystal 33 can be aligned in a direction parallel to the sub-pixels 31 at an initial state without being supplied with a voltage; wherein the alignment layer is made of, for example, organic materials such as polyimide.

Figure 2:
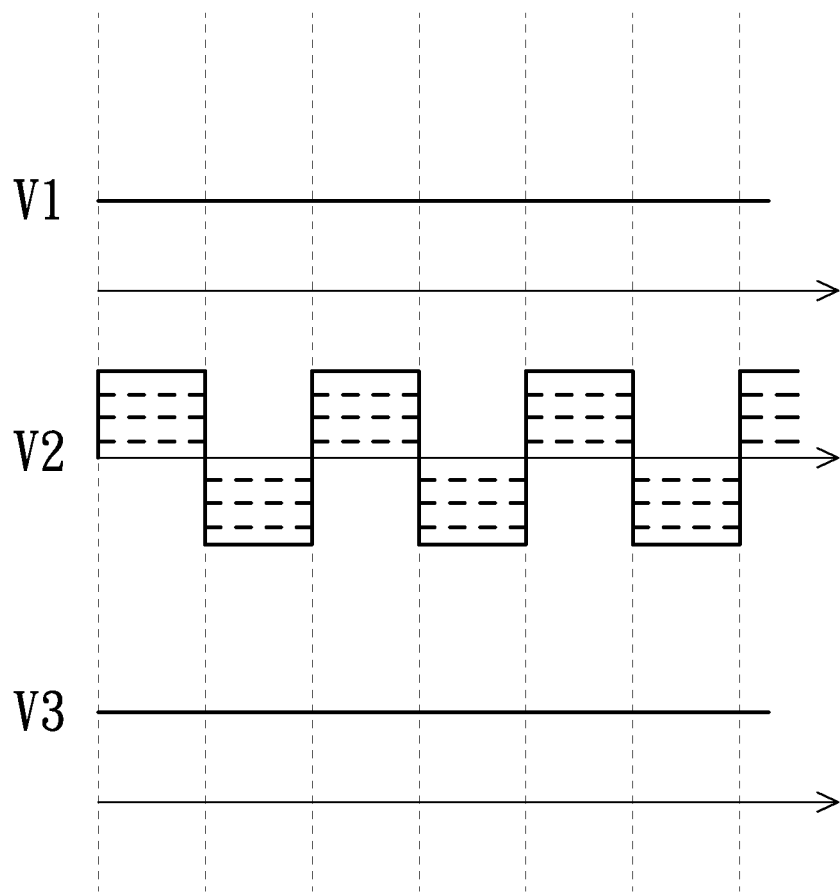
FIG. 2 is a schematic waveform view of the driving signals associated with the peep-proof display apparatus of the present disclosure being operated in the first display mode.

FIG. 2 is a schematic waveform view of the driving signals associated with the peep-proof display apparatus 150 being operated in the first display mode; wherein in FIG. 2 the horizontal axis represents the scale of time and the vertical axis represents the scale of voltage. Please refer to FIGS. 1A and 2 both. In the first display mode (e.g., the wide viewing angle display mode), the first conductive layer 10 and the third conductive layer 60 both are supplied with a first voltage V1 (is also referred to the top-electrode) and a third voltage V2 (is also referred to the bottom-electrode) both having a constant value, respectively; and the second conductive layer 40 is supplied with the second voltage V2 (is also referred to the pixel-electrode). Specifically, the second voltage V2 herein is served as a data voltage being applied to the pixels, and the data voltage has a value varying with the grayscale of the image data and polarities varying with frame periods. For example, as illustrated in FIG. 2, the second voltage V2 is configured to be in a voltage operation range smaller than the first voltage V1 (or, the third voltage V3) in the first frame period and in a voltage operation range not greater than the first voltage V1 (or, the third voltage V3) in the second frame period. Specifically, in the first display mode, the first voltage V1 is a DC voltage (for example, 5 volts); the second voltage V2 is an AC voltage (for example, 0~10 volts); and the third voltage V2 is a DC voltage (for example, 5 volts). In the first play display mode, through applying the second voltage V2 to the second conductive layer 40, an electric field parallel to the sub-pixels 31 is generated and consequently the liquid crystal 33 can have horizontal rotations with a specific rotation amount as illustrated in FIG. 1A by the force generated by the electric field; thus, the peep-proof display apparatus 150 in the first display mode can have a proper wide viewing angle display effect. In addition, because the isolation film 20 is made of insulating materials, the first conductive layer 10 can have lower interferences on the optical modulator layer 30 and consequently the liquid crystal 33 can be prevented from being affected by the first conductive layer 10.

Figure 3:
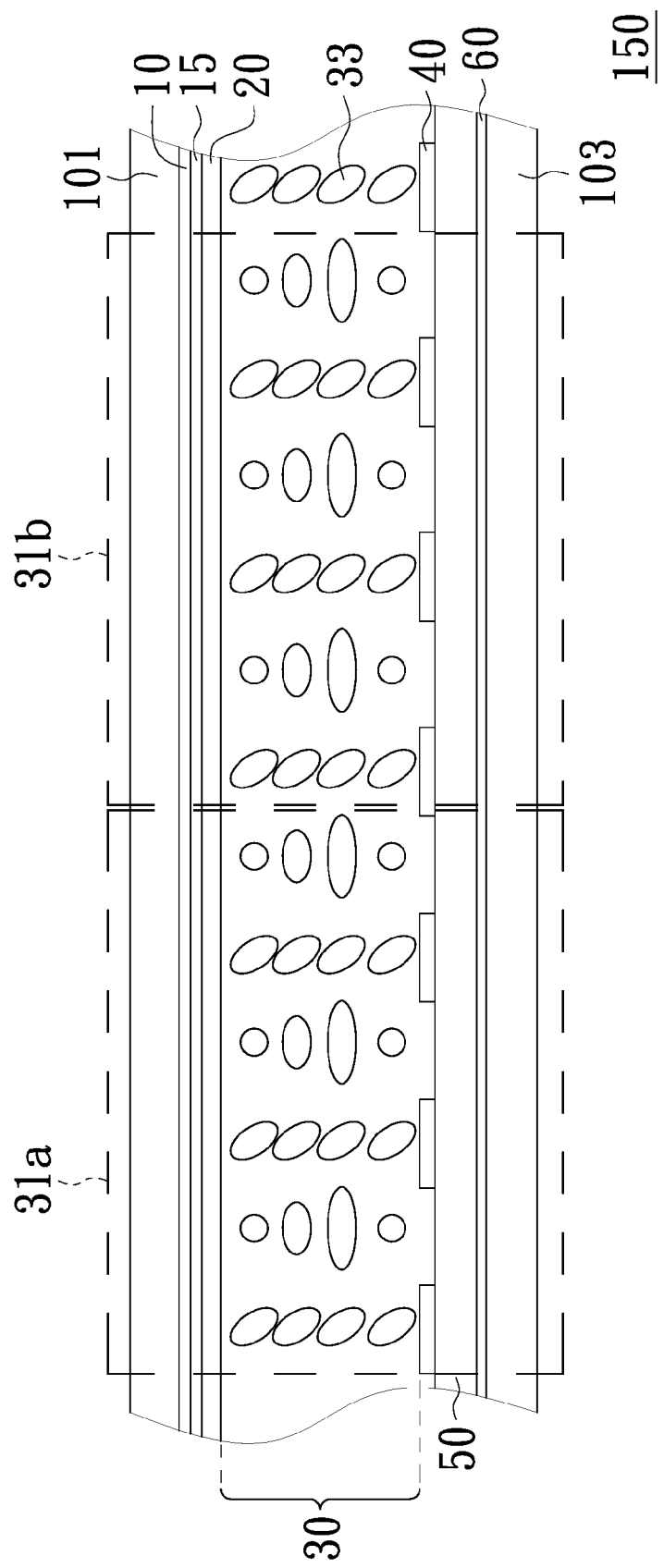
FIG. 3 is a schematic view of the peep-proof display apparatus of the present disclosure being operated in the second display mode.

FIG. 3 is a schematic view of the peep-proof display apparatus 150 being operated in a second display mode. As shown, in the second display mode (e.g., a narrow viewing (NV) angle display mode) the major axes of the liquid crystal 33 are aligned to have a specific angle relative to the second conductive layer 40 by applying an electric field perpendicular to the optical modulator layer 30; meanwhile the liquid crystal 33 can also have the rotation force by applying an electric field parallel to the optical modulator layer 30. Thus, the peep-proof display apparatus 150 in the second display mode can have a proper narrow viewing angle display effect without the need of the additional sub-pixels for the adjustment of the light leakage degree.

Figure 4:
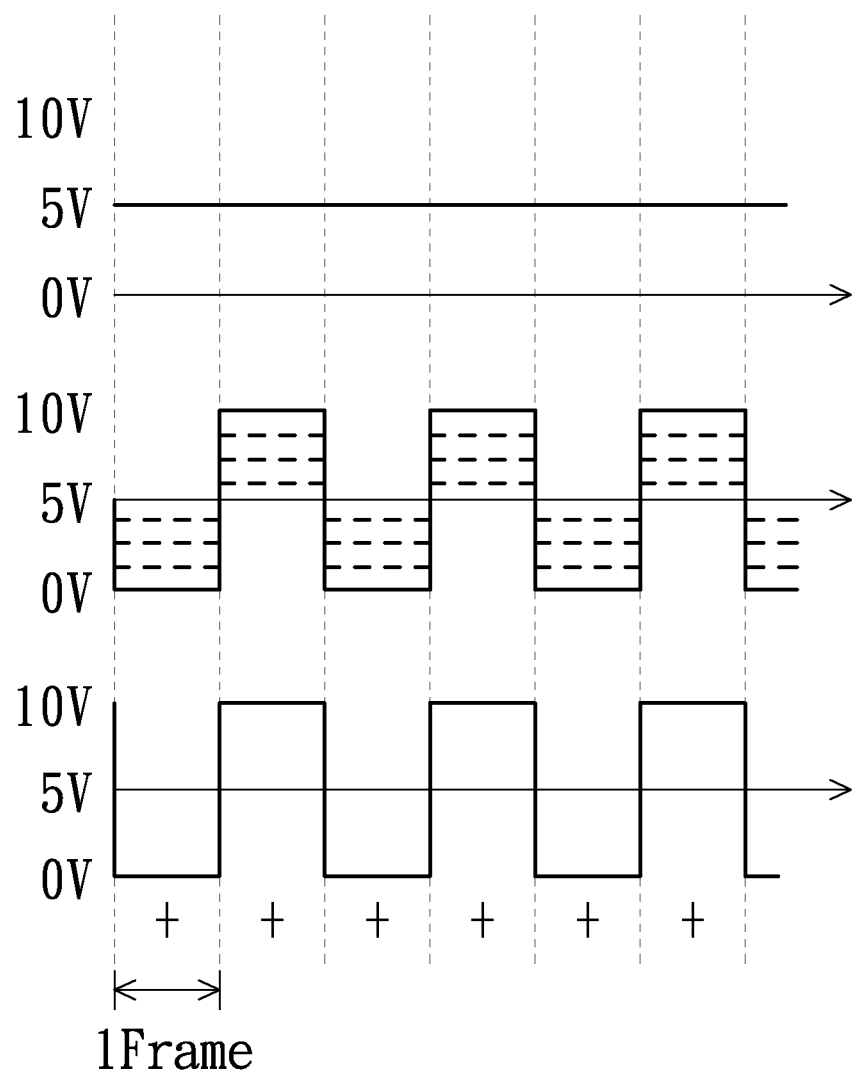
FIG. 4 is a schematic waveform view of the driving signals associated with the peep-proof display apparatus of the present disclosure being operated in the second display mode.

FIG. 4 is a schematic waveform view of the driving signals associated with the peep-proof display apparatus 150 being operated in the second display mode (e.g., a narrow viewing angle display mode); wherein in FIG. 4 the horizontal axis represents the scale of time and the vertical axis represents the scale voltage. Please refer to FIGS. 3 and 4 both. In the second display mode (e.g., a wide viewing angle display mode). As shown, the first voltage V1 is configured to have a constant value. The second voltage V2, herein serving as a data voltage for being applied to the pixels, is configured to have a value varying with the grayscale of the image data and have polarities varying with frame periods. The third voltage V3 is an AC voltage and configured to have polarities varying with frame periods.

Specifically, in the second display mode of one embodiment, the first conductive layer 10 is supplied with the first voltage V1 having a constant value; the second conductive layer 40 is supplie3d with the second voltage V2 having varying value and having polarities varying with frame periods; and the third conductive layer 60 is supplied with the third voltage V3 having varying value and polarities varying with frame periods. For example, as illustrated in FIG. 3, the second conductive layer 40 in the first frame period is supplied with the second voltage V2 configured to have a voltage operation range not greater than the third voltage V3; wherein the third voltage V3 is greater than the first voltage V1 in the first frame period. And, the second conductive layer 40 in the second frame period is supplied with the second voltage V2 configured to have a voltage operation range not less than the third voltage V3; wherein the third voltage V3 is smaller than the first voltage V1 in the second frame period. As mentioned above, it is to be noted that in the second display mode, the first voltage V1 is configured to have a constant value (for example, 5 volts); the second voltage V2 is configured to have a varying value (for example, 0~10 volts), and the third voltage V3 is configured to have a varying value (for example, 0~10 volts). For example, in a positive polarity, the third voltage V3 of 0V is applied to the third conductive layer 60; and in a negative polarity, the third voltage V3 of 10V is applied to the third conductive layer 60. Therefore, the first conductive layer 10 and the third conductive layer 60 have a voltage difference therebetween, and accordingly an electric field perpendicular to the first substrate 101 (shown in FIG. 1A) is generated by the voltage difference; thus, the major axes of the liquid crystal 33 can be aligned to a specific angle by the electric field.

Please refer to FIGS. 3, 4 again. By supplying the first voltage V1 with a constant value to the third conductive layer 60, supplying the second voltage V2 to the second conductive layer 40 and supplying the third voltage V3 with an AC voltage format and having polarities varying with frame periods to the first conductive layer 10, the first conductive layer 10 and the third conductive layer 60 in another embodiment can also have a voltage difference therebetween and thereby generating an electric field electric substantially perpendicular to the first substrate 101 in the second display mode. The principle and the driving method of the generation of the electric field are similar to that in the aforementioned embodiment; and no unnecessary detail is given here. Likewise. by supplying the first voltage V1 with a constant value to the first conductive layer 10, supplying the second voltage V2 to the third conductive layer 60 and supplying the third voltage V3 with an AC voltage format and having polarities varying with frame periods to the second conductive layer 20, the first conductive layer 10 and the third conductive layer 60 in still another embodiment can also have a voltage difference therebetween and thereby generating an electric field electric substantially perpendicular to the first substrate 101 in the second display mode. In summary, through configured the first conductive layer 10 and the third conductive layer 60 to have a nonzero voltage difference therebetween and thereby generating an electric field electric substantially perpendicular to the sub-pixels 31, the major axes of the liquid crystal 33 can be aligned to a specific angle; in addition, with applying a specific voltage and thereby generating an electric field electric perpendicular to the sub-pixels 31, the liquid crystal 33 can be rotated in the horizontal direction.

Figure 5A:
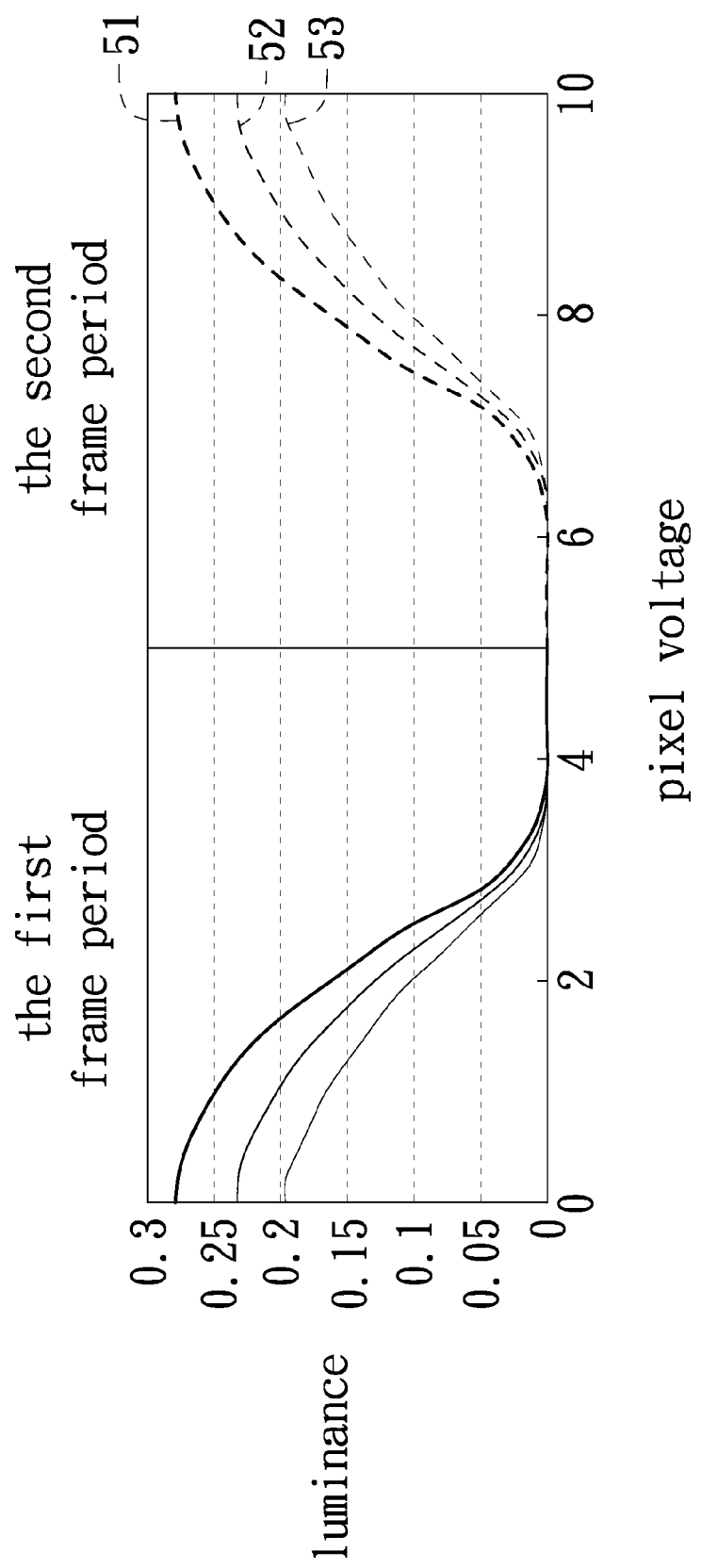
FIG. 5A is a schematic simulation chart illustrating a relationship of the data voltage and corresponding luminance derived from the peep-proof display apparatus of the present disclosure being operated in the first display mode.
Figure 6A:
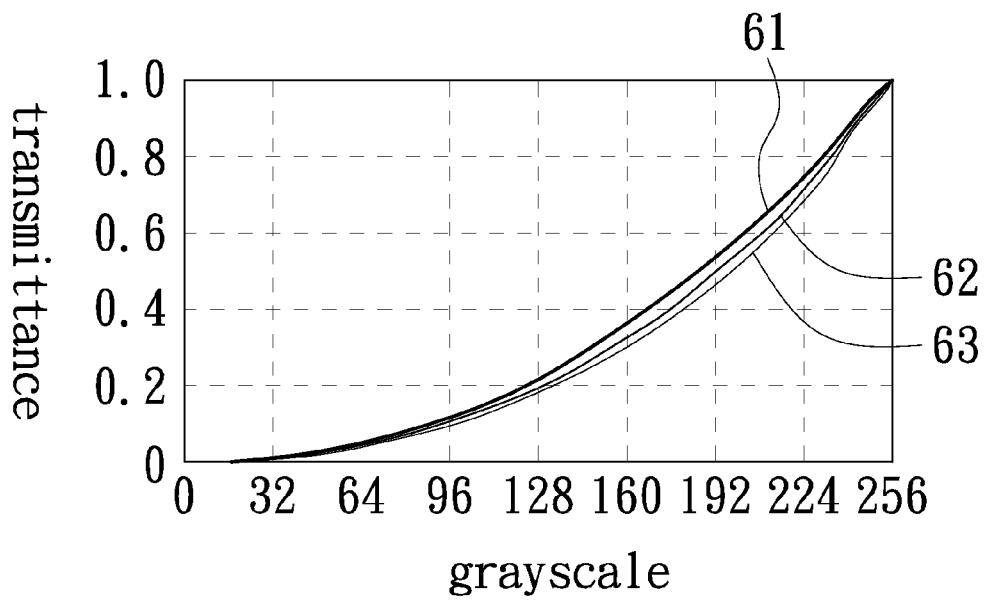
FIG. 6A is a schematic simulation gamma-curve view derived from the peep-proof display apparatus of the present disclosure being operated in the first display mode.

FIG. 5A is a schematic simulation chart illustrating a relationship of the data voltage and corresponding luminance derived from the peep-proof display apparatus 150 being operated in the first display mode; wherein in FIG. 5A the horizontal axis represents the scale of second voltage V2 (i.e., the data voltage) which is applied to the second conductive layer 40, and the vertical axis represents the scale of luminance. In the first display mode the peep-proof display apparatus 150 is configured to have the first conductive layer 10 and the third conductive layer 60 thereof both supplied with the first voltage V1 (e.g., a DC voltage of 5V). As shown in FIG. 5A, the curve 51 is obtained by arranging the viewing angle and the display surface to have a normal line difference of 0 degree therebetween; the curve 52 is obtained by arranging the viewing angle and the display surface to have a normal line difference of 45 degrees therebetween; and the curve 53 is obtained by arranging the viewing angle and the display surface to have a normal line difference of 60 degrees therebetween. In addition, by performing a transform on the curves 51, 52 and 53 in FIG. 5A, three corresponding gamma curves, for indicating the relationship of grayscale and normalized transmittance associated with the peep-proof display apparatus 150 with specific configurations in the first display mode, can be obtained as illustrated in FIG. 6A. As shown, the curve 61 with a gamma value of 2.2 is obtained by arranging the viewing angle to have 0 degree relative to the normal line of the display surface; the curve 62 is obtained by arranging the lateral viewing angle to have 45 degrees relative to the normal line of the display surface; and the curve 63 is obtained by arranging the lateral viewing angle to have 60 degrees relative to the normal line of the display surface. As illustrated in FIG. 6A, it is to be noted that the curves 62, 63 have no much difference relative to the curve 61; thus, the peep-proof display apparatus 150 of the disclosure can have a proper wide viewing angle characteristic while being operated in the first display mode.

Figure 5B:
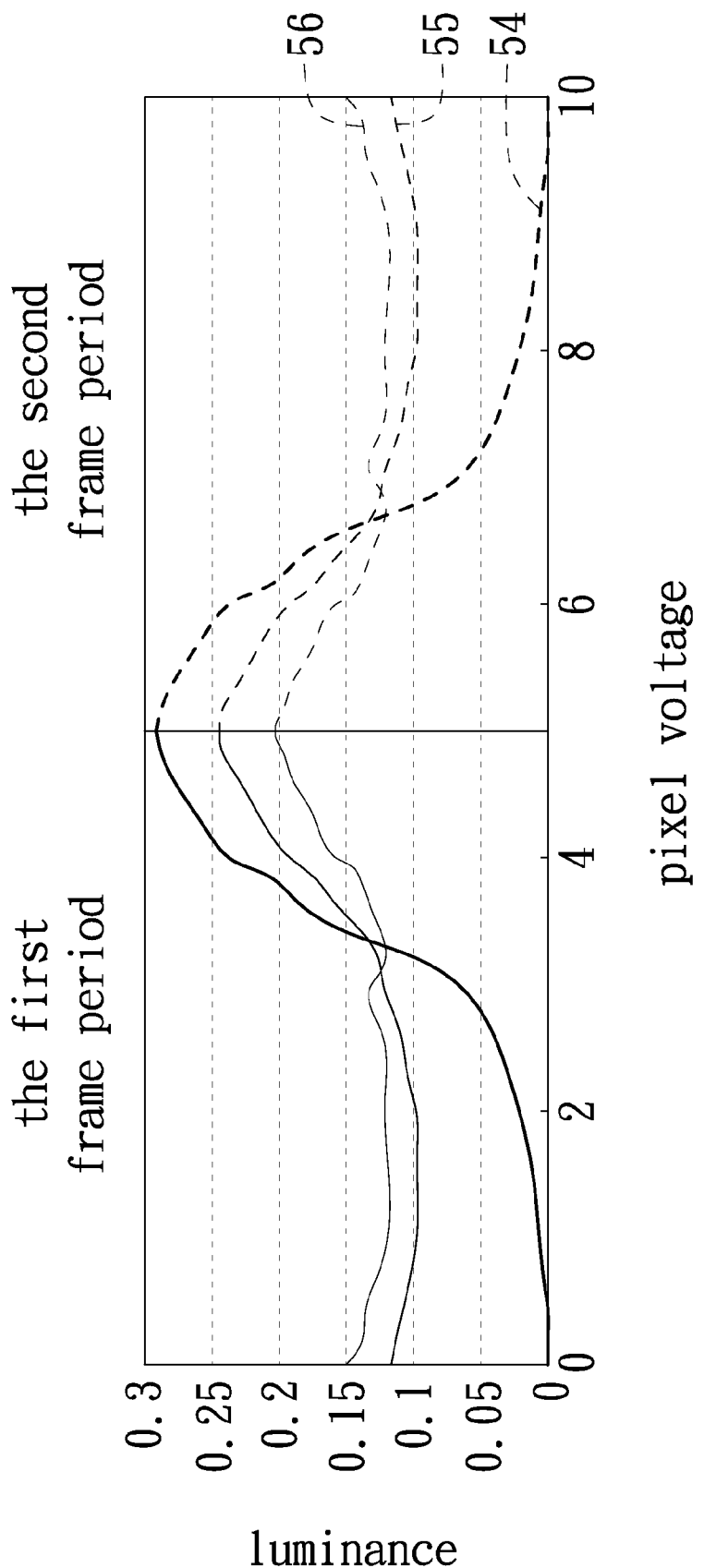
FIG. 5B is a schematic simulation chart illustrating a relationship of the data voltage and corresponding luminance derived from the peep-proof display apparatus of the present disclosure being operated in the first display mode.
Figure 6B:
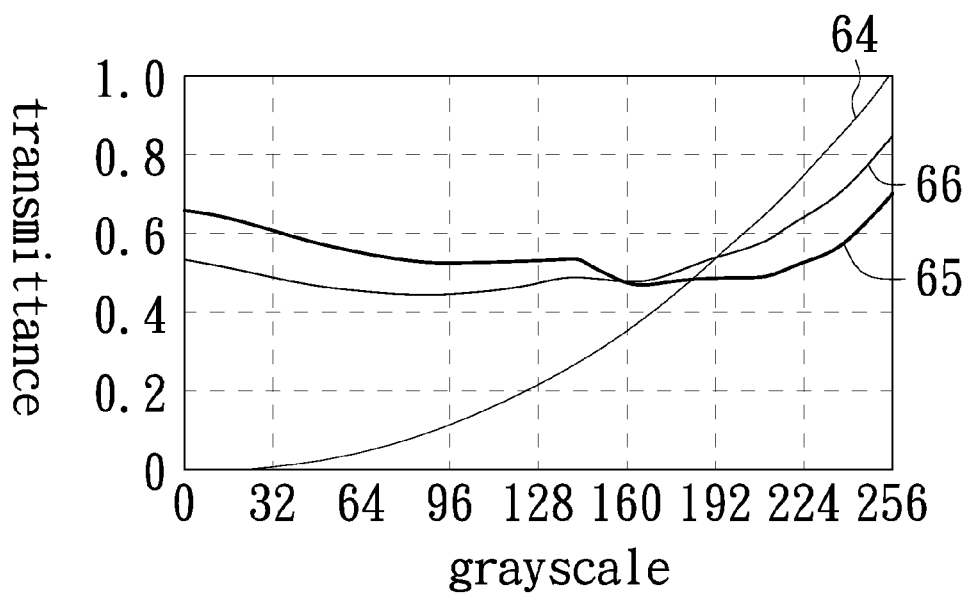
FIG. 6B is a schematic simulation gamma-curve view derived from the peep-proof display apparatus of the present disclosure being operated in the second display mode.

FIG. 5B is a schematic simulation chart illustrating a relationship of the data voltage and corresponding luminance derived from the peep-proof display apparatus 150 being operated in the second display mode; wherein in FIG. 5B the horizontal axis represents the scale of second voltage V2 (i.e., the data voltage) which is supplied to the second conductive layer 40, and the vertical axis represents the scale of luminance. In the second display mode, the peep-proof display apparatus 150 is configured to have the first conductive layer 10 and the third conductive layer 60 thereof respectively supplied with a voltage of 5V and a voltage of 0V in the first frame period and respectively supplied with a voltage of 5V and a voltage of 10V in the second frame period. As shown in FIG. 5B, the curve 54 is obtained by arranging the viewing angle and the display surface to have a normal line difference of 0 degree therebetween; the curve 55 is obtained by arranging the viewing angle and the display surface to have a normal line difference of 45 degrees therebetween; and the curve 56 is obtained by arranging the viewing angle and the display surface to have a normal line difference of 60 degrees therebetween. In addition, it is to be noted the curves 54, 55 and 56 each have symmetry in two consecutive frame periods. Likewise, by performing a transform on the curves 54, 55 and 56 in FIG. 5B, three corresponding gamma curves, for indicating the relationship of grayscale and normalized transmittance associated with the peep-proof display apparatus 150 with specific configurations in the second display mode, can be obtained as illustrated in FIG. 6B. As shown, the curve 64 with a gamma value of 2.2 is obtained by arranging the viewing angle and the display surface to have a normal line difference of 0 degree therebetween; the curve 65 is obtained by arranging the viewing angle and the display surface to have a normal line difference of 60 degrees therebetween; and the curve 66 is obtained by arranging the viewing angle and the display surface to have a normal line difference of 45 degrees therebetween. As illustrated in FIG. 6B, it is to be noted that the curves 62, 63 have no much difference in side-view luminance with the increasing of the grayscale; thus, the peep-proof display apparatus 150 can have the peep-proof ability due to having a relatively low contrast of a side-view image.

To those ordinarily skilled in the art, it is understood that a driving method of the peep-proof display apparatus 150 can be summarized from the aforementioned associated operations of the peep-proof display apparatus 150. Please refer back to FIGS. 1-4. First, the driving method determines that the peep-proof display apparatus 150 is being operated either in the first display mode (for example, the wide viewing angle display mode) or in the second display mode (for example, the narrow viewing angle display mode). In general, the determination of the current display mode of the peep-proof display apparatus 150 can be realized by detecting the control signal of viewing angle switch, or realized by software.

Next, the driving method applies the second voltage V2 to the second conductive layer 40 and the first voltage V1 with a constant value to both of the first conductive layer 10 and the third conductive layer 60, if the peep-proof display apparatus 150 is being operated in the first display mode; alternatively, the driving method applies an electric field, substantially perpendicular to the light modulator layer 30, to the light modulator layer 30 and thereby changing the arrangement direction of the liquid crystal 33, if the peep-proof display apparatus 150 is being operated in the second display mode. For example, an electric field perpendicular to the light modulation element layer 30 can be formed by applying the second voltage V2 to the second conductive layer 40, the first voltage V1 with a constant value to the first conductive layer 10 and the third voltage V3 with a variable value to the third conductive layer 60; wherein the third voltage V3 is an AC voltage and has polarities varying with frame periods. Therefore, besides having a rotation movement by the parallel electric field, the liquid crystal 33 can further have tilt movement relative to a specific angle by the electric field perpendicular to the light modulation element layer 30. Thus, under the interaction of the rotation movement and tilt movement, the side-view image can have a lower contrast due to not much variation in the side-view illumination; and consequently the embodiment of the present disclosure has an improved peep-proof function.

In summary, through the peep-proof display apparatus and the driving method thereof disclosed according to the present disclosure, the object of peep-proof effect is realized. Furthermore, the quality of display image is still maintained in a normal viewing angle.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A driving method of a peep-proof display apparatus, the peep-proof display apparatus comprising a plurality of sub-pixels, each one of the sub-pixels comprising a first conductive layer, an isolation film, a light modulator layer, a second conductive layer, an insulation film and a third conductive layer, the first conductive layer comprising two surfaces and on one of which a first substrate is disposed, the isolation film being disposed on another surface of the first conductive layer, the light modulator layer comprising a plurality of liquid crystal, the light modulator layer being disposed between the isolation film and the second conductive layer, the insulation film being disposed between the second and third conductive layers, and a second substrate being disposed on another surface of the third conductive layer, comprising:

applying a first voltage to both of the first and third conductive layers and a second voltage to the second conductive layer in a first display mode;

applying an electric field, parallel to the light modulator layer, and an electric field, perpendicular to the light modulator layer, to the light modulator layer in a second display mode; and applying a voltage difference between the first and third conductive layers in the second display mode, wherein the second voltage is a data voltage of an image grayscale and the second voltage is configured to have polarities varying with frame periods.

2. The driving method according to claim 1, wherein the first voltage is a DC voltage.

3. The driving method according to claim 1, further comprising:

applying the first voltage to the first conductive layer, the second voltage to the second conductive layer and a third voltage to the third conductive layer in the second display mode.

4. The driving method according to claim 1, further comprising:

applying the first voltage to the first conductive layer, a third voltage to the second conductive layer and the second voltage to the third conductive layer in the second display mode.

5. The driving method according to claim 1, further comprising:

applying a third voltage to the first conductive layer, the second voltage to the second conductive layer and the first voltage to the third conductive layer in the second display mode.

6. The driving method according to claim 3, wherein the third voltage is configured to have polarities varying with frame periods.

7. The driving method according to claim 4, wherein the third voltage is configured to have polarities varying with frame periods.

8. The driving method according to claim 5, wherein the third voltage is configured to have polarities varying with frame periods.

* * * * *